No. 896,854. PATENTED AUG. 25, 1908.
A. S. PARSONS.
TRAIN PIPE COUPLING.
APPLICATION FILED JULY 10, 1906.

Witnesses
Edwin L. Jewell
P. W. Sommers

Inventor
Albert S. Parsons
By Henry Orth Jr.
Attorney

UNITED STATES PATENT OFFICE.

ALBERT S. PARSONS, OF BERKELEY, CALIFORNIA.

TRAIN-PIPE COUPLING.

No. 896,854.　　　　Specification of Letters Patent.　　　Patented Aug. 25, 1908.

Application filed July 10, 1906. Serial No. 325,517.

*To all whom it may concern:*

Be it known that I, ALBERT S. PARSONS, a citizen of the United States of America, residing at Berkeley, Alameda county, California, have invented certain new and useful Improvements in Train-Pipe Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to coupling for train pipes and has for its object a train pipe coupling in which are arranged the ends of a large number of pipes capable of being simultaneously coupled by the coupling of the head, as well as electric conductors and means for coupling them at the same time that the train pipes are coupled, the ends of all pipes and of the conductors terminating in the head.

Figure 1:
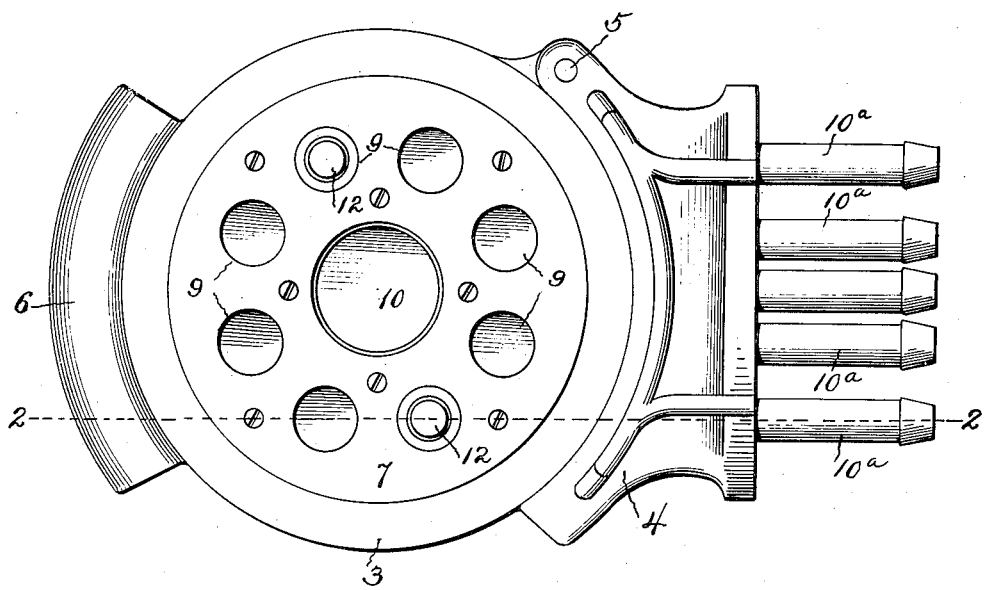
Figure 2:
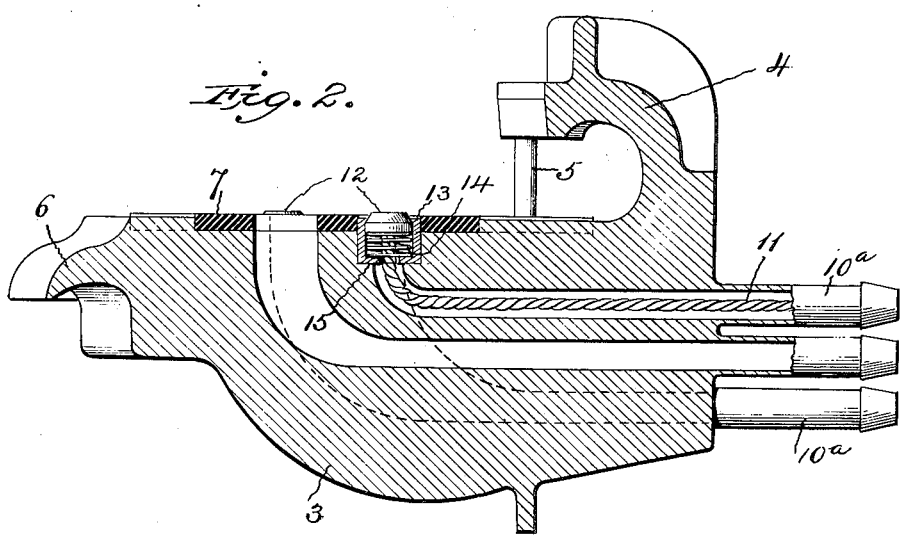

Referring to the drawings in which like parts are similarly designated, Figure 1, is a plan view of such a head, and Fig. 2, is a section on the line 2—2, Fig. 1.

The general shape of the coupling head is similar to that now in general use for coupling a single train pipe, but is considerably larger. In the drawings I have shown 9 independent points to be connected and these points are not concentric but are distributed over the coupling faces in any other desired manner. The coupling head comprises a casting 3 with the usual overhang 4, a stop pin 5, and locking lip 6. The face of the coupling is provided with a recessed seat for the reception of the rubber disk 7 having a number of holes corresponding to and adapted to register with the ends of the train pipes and electric conduits. The rubber disk 7 is held in place by screws 8 and a suitable cement. Through the several conduits 9 and 10 I pass any fluid as steam, compressed air for any desired purposes, as well as illuminating gas. The central opening 10, is larger in diameter at the face of the coupling than the remainder of the pipes and is preferably but not necessarily used as a steam pipe. Electric wires 11 are connected to the contact plugs 12. Each plug is surrounded by an insulating sleeve 13 and is yieldingly held by spring 14, said spring and sleeve being seated on a shoulder 15 formed on the end of the electric conduit. By arranging the ends or ports of the several pipes 10$^a$ as shown so that each will be independent of the other and having comparatively large rubber surfaces between them, I find that I can dispense with all those devices required to take care of leakage and that the joint when made will be perfectly tight.

The contact plugs 12 are provided with a beveled edge so that when the two coupling faces are slid together and locked the oppositely positioned plugs will first contact with one another at their beveled faces, mutually depress one another and be held by their springs in contact when the train pipe coupler heads are in locked position.

I claim,

A train pipe coupler comprising a pair of interlocking recessed heads provided with a number of independent conduits having their ports terminating in the recess, a yielding packing fixed in the recess having holes registering with the ports of the conduits, there being a large central port and a number of smaller ports arranged around the same, insulating sleeves seated on shoulders in some of the conduits, springs mounted in the sleeves, contact plugs supported by the springs normally held above the face of the packing ring and having beveled ends whereby oppositely positioned plugs will slide on one another.

In testimony that I claim the foregoing as my invention, I have signed my name in presence of two subscribing witnesses.

ALBERT S. PARSONS.

Witnesses:
　J. D. YOAKLEY,
　HENRY ORTH, Jr.